United States Patent
Ono

(10) Patent No.: US 7,471,201 B2
(45) Date of Patent: Dec. 30, 2008

(54) RFID TAG AND MERCHANDISE MANAGEMENT SYSTEM

(75) Inventor: Tomohiro Ono, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 477 days.

(21) Appl. No.: 11/227,282

(22) Filed: Sep. 15, 2005

(65) Prior Publication Data
US 2006/0145857 A1 Jul. 6, 2006

(30) Foreign Application Priority Data
Dec. 22, 2004 (JP) ............... 2004-371839

(51) Int. Cl.
G08B 13/14 (2006.01)

(52) U.S. Cl. .......... 340/572.1; 340/10.5; 340/10.3; 340/572.3; 235/492; 235/382

(58) Field of Classification Search ........ 340/572.1, 340/10.1, 635, 636.1, 636.12, 636.13, 657, 340/663
See application file for complete search history.

(56) References Cited

U.S. PATENT DOCUMENTS

2005/0026117 A1* 2/2005 Judson et al. .......... 434/154
2005/0263591 A1* 12/2005 Smith .................... 235/385
2006/0079204 A1* 4/2006 Pon et al. ............... 455/411
2006/0131375 A1* 6/2006 Myllymaki ............. 235/375

FOREIGN PATENT DOCUMENTS

| CN | 1265215 A | 8/2000 |
| JP | 2001175824 | 6/2001 |
| JP | 2002-074286 | 3/2002 |
| JP | 2003-337928 | 11/2003 |
| WO | 9905658 | 2/1999 |

OTHER PUBLICATIONS

Office Action from the Chinese Patent Office for Application No. 2005101096801, with English Translation; English translation (8 pages); Chines Office Action (9 pages).

* cited by examiner

Primary Examiner—Jeff Hofsass
Assistant Examiner—Ojiako Nwugo
(74) Attorney, Agent, or Firm—Gauthier & Connors LLP

(57) ABSTRACT

The present invention provides an RFID tag having an identification information response function that wirelessly transmits tag identification information stored in the RFID tag in response to a predetermined wireless request, wherein, the identification information response function becomes invalid after an invalidation instruction is input from outside followed by a lapse of predetermined period of time.

14 Claims, 6 Drawing Sheets

RFID TAG AND MERCHANDISE MANAGEMENT SYSTEM

PRIORITY INFORMATION

This application claims priority to Japanese Patent Application No. 2004-371839 filed Dec. 22, 2004, which is incorporated herein by reference in its entirety.

BACKGROUND OF THE INVENTION

1. Field of the Invention

The present invention relates to an RFID (radio frequency identification) tag having an identification information response function that wirelessly transmits tag identification information stored in the RFID tag in response to a predetermined wireless request, and a merchandise management system using such an RFID tag.

2. Description of the Related Art

In recent years, a great deal of attention has come to be focused on use of RFID tag systems in merchandise management. Such RFID tag systems allow non-contact reading of merchandise data stored in a tag. Further, such an RFID tag system allows simultaneous reading of merchandise data from multiple tags. Therefore, such RFID tag systems can significantly improve the efficiency of merchandise management in production, distribution, and sale.

However, RFID tags have the following problems. Specifically, unique tag identification information is assigned to each RFID tag, and RFID tags are configured to transmit the tag identification information in response to an external wireless request. As a result, because it is possible to identify an individual item of merchandise by reading tag identification information from an RFID tag attached to the item of merchandise, there is a risk that when and where the purchaser purchased the item may be known to other people. There is also a risk that a purchase history, credit card information, and other information stored in a database may be leaked to outsiders through the use of tag identification information. Further, there is also a possibility that, when an RFID tag is attached to clothes or a bag worn by a person, movement of that person may be tracked through the use of tag identification information. These problems are generally referred to as "privacy problems of RFID tags", and represent a significant impediment to the full-scale introduction of RFID tags at the retail level.

In order to solve the above-described privacy problems of RFID tags, a technique has been proposed in which, at the time of purchasing an item of merchandise, a command known as a "Kill Command" is transmitted to an RFID tag from a reader/writer to invalidate the RFID tag.

a structure has been disclosed that a one-time password is held in a RAM (random access memory) that receives power supply from a power storage device, and the one-time password disappears when the power storage device is discharged. Although this structure can be effective in reducing the risk of unauthorized use of a one-time password, the above-described privacy problems are not solved because the tag identification information itself remains.

On the other hand, when an item of merchandise is returned after purchase, if it is possible to read tag identification information and merchandise data from an RFID tag attached to that item, it is easy to manage returned item, and it is possible to suitably respond to customer requests.

However, because the above-described invalidation technique invalidates an RFID tag at the same time as purchase of merchandise, it is impossible to read tag identification information from the RFID tag after completion of payment, such that it is no longer possible to easily manage returned merchandise.

SUMMARY OF THE INVENTION

According to one aspect of the present invention, there is provided an RFID tag having an identification information response function that wirelessly transmits tag identification information stored in the RFID tag in response to a predetermined wireless request, wherein the identification information response function becomes invalid after an invalidation instruction is input from outside followed by a lapse of predetermined period of time.

Further, according to another aspect of the present invention, there is provided an RFID tag comprising an identification information response function that wirelessly transmits tag identification information stored in the RFID tag in response to a predetermined wireless request, a power storage device that stores power; a volatile memory device that receives the power supply from the power storage device, and prestores validity information indicating that the identification information response function is valid; and a controller device that determines the identification information response function is valid when the validity information is stored in the volatile memory device, and, determines that the identification information response function is invalid when the validity information is not stored in the volatile memory device, wherein, the identification information response function becomes invalid when a voltage of the power storage device decreases and the validity information volatilizes.

Further, according to still another aspect of the present invention, there is provided a merchandise management system comprising an RFID tag that is attached to each item of merchandise and has an identification information response function that wirelessly transmits tag identification information stored in the RFID tag in response to a predetermined wireless request, wherein, the identification information response function becomes invalid; and a reader unit that wirelessly transmits the predetermined request and reads the tag identification information from the RFID tag after an invalidation instruction is input from outside followed by a lapse of predetermined period of time.

BRIEF DESCRIPTION OF THE DRAWINGS

Embodiments of the present invention will be described in detail based on the following figures, wherein.

DETAILED DESCRIPTION OF THE INVENTION

Embodiments of the present invention will be described below with reference to the drawings.

FIRST EMBODIMENT

Figure 1:
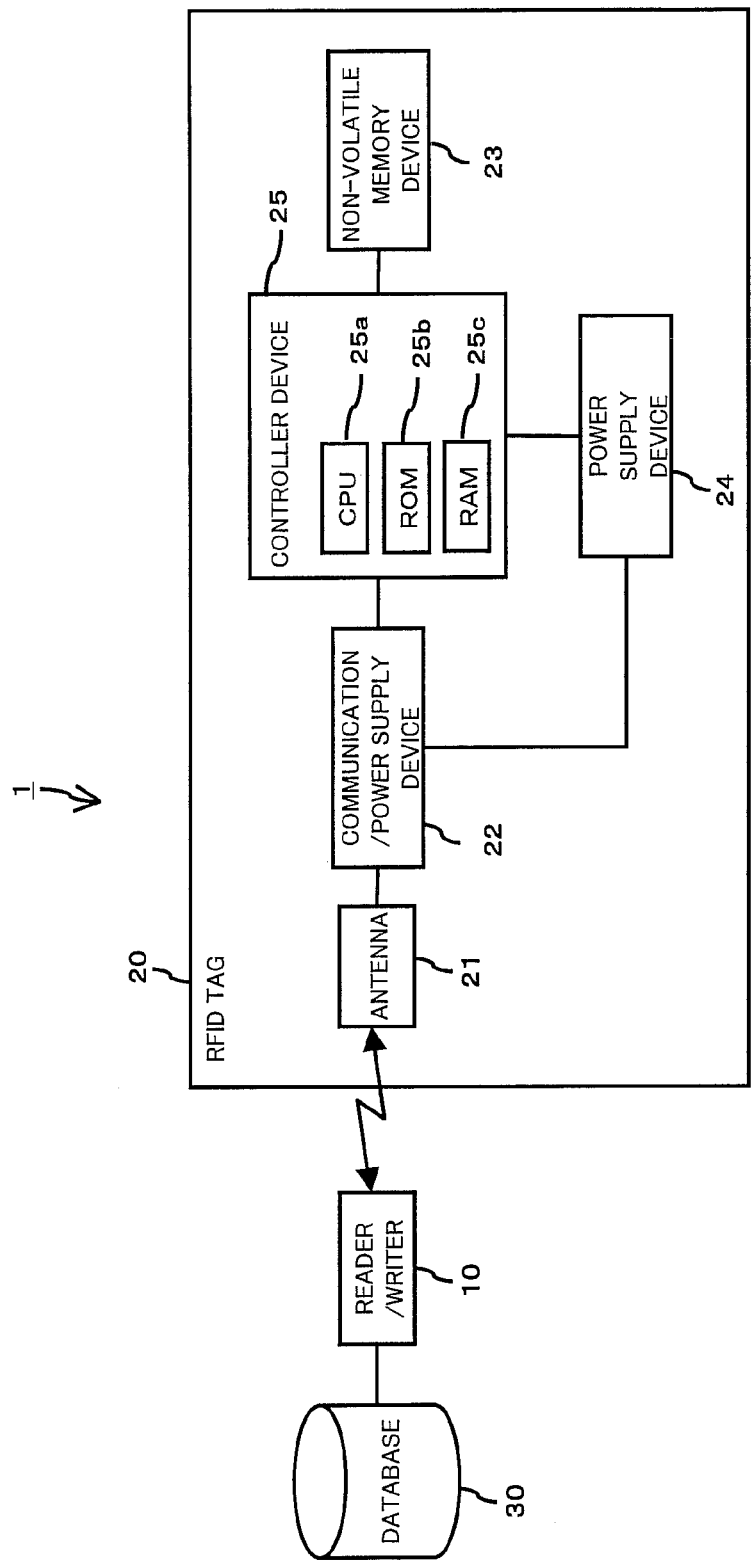
FIG. 1 is a block diagram showing a structure of a merchandise management system according to a first embodiment of the present invention.

FIG. 1 is a block diagram showing a structure of a merchandise management system 1 according to a first embodiment of the present invention. This merchandise management system 1 is a system that manages merchandise using an RFID tag system. RFID tag systems are non-contact type individual identification systems, also known as non-contact IC tag systems, wireless tag systems, or the like. Specifications of an RFID tag system, such as the type of tag system (including a close contact type, a proximity type, a vicinity type, and a remote type), the mode of communication (including an electromagnetic coupling mode, an electromagnetic induction mode, and a radio wave mode), the mode of supplying power to tags (including passive type, and active type), communication protocols, and the like, may be selected as desired. However, in the example of the present embodiment, a passive type RFID tag system, which is often preferable from the viewpoint of cost or other reasons, is employed. As shown in FIG. 1, the merchandise management system 1 includes a reader/writer 10, an RFID tag 20, and a database 30.

The reader/writer 10 is a device that wirelessly reads (or reads and writes) data from (or from and to) the RFID tag 20, and supplies power to the RFID tag 20. The reader/writer 10 exchanges data with the RFID tag 20 attached to an item of merchandise in the process of distribution of merchandise, or at the time of payment for the item of merchandise, and can, for example, be of a portable type that can be carried by a merchandise manager, or of a fixed type that is placed at a checkout counter in a retail store. Because the reader/writer 10 as used herein is well known in the art, the detail description thereof is omitted here.

The RFID tag 20 is a non-contact IC tag for individual identification. In this embodiment, the RFID tag 20 is a merchandise tag for individually identifying an item of merchandise, and is attached to each item of merchandise. Tag identification information (hereinafter, referred to as "a unique ID") is pre-assigned, and stored in each RFID tag 20. This unique ID is individual identification information for identifying RFID tags. The RFID tag 20 has an identification information response function of wirelessly transmitting a unique ID stored in the RFID tag 20 in response to a predetermined request requesting transmission of a unique ID. This identification information response function is a basic function of an RFID tag, and achieves basic features of an RFID tag, such as non-contact individual identification and anti-collision. With this function, it is possible to simultaneously identify multiple RFID tags in a non-contact manner, for example, at a checkout counter, and payment can be processed more easily and more quickly than with a barcode system or the like. As described earlier, this identification information response function may cause privacy problems, but is useful when merchandise is returned after purchase.

With this being the situation, in order to reduce the privacy problems and simplify the management of returned merchandise, the RFID tag 20 according to the present embodiment has a structure such that the identification information response function becomes invalid after a predetermined period of time elapses from a time when a predetermined invalidation instruction is input from the outside. In this structure, the method for inputting an invalidation instruction is not limited to a particular method, but an invalidation instruction may be electrically input, or may also be physically input. The predetermined period of time from input of an invalidation instruction until invalidation may be defined in any manner. Further, invalidation of the identification information response function may be performed in any suitable manner, such as using software-based control, or destroying an electronic device. In the present embodiment, upon receipt of an invalidation command from the reader/writer 10, the RFID tag 20 measures an elapsed time after the receipt, and invalidates the identification information response function when this elapsed time exceeds the predetermined period of time.

As shown in FIG. 1, the RFID tag 20 includes an antenna 21, a communication/power supply device 22, a non-volatile memory device 23, a power supply device 24, and a controller device 25.

The antenna 21 is used to receive and emit electromagnetic waves and, for example, is formed using a loop-shaped coil.

The communication/power supply device 22 is a circuit that performs communication processing and power conversion processing, and, for example, is formed using a demodulator circuit, a modulator circuit, a rectifier circuit, and a regulator circuit. Specifically, the communication/power supply device 22 demodulates a modulated signal received by the antenna 21 to transmit resultant reception data to the controller device 25. Further, the communication/power supply device 22 modulates transmission data received from the controller device 25 to transmit a resultant transmission signal to the outside through the antenna 21. Further, the communication/power supply device 22 rectifies an AC (alternating current) voltage generated by the antenna 21 in response to electromagnetic waves coming from the outside to a DC (direct current) voltage, and stabilizes this DC voltage at a predetermined voltage to supply resultant DC power to individual parts of the RFID tag 20 as operating power.

The non-volatile memory device 23 is a non-volatile storage medium that stores validity information indicating that the identification information response function is valid. In this embodiment, the non-volatile memory device 23 is a data readable and writable non-volatile semiconductor memory, such as, for example, an EEPROM (electrically erasable programmable read-only memory). Other data other than the validity information, such as merchandise data including the price, type, and other details of an item of merchandise, may also be written to this non-volatile memory device 23.

The power supply device 24 is used to supply power to the controller device 25 during a non-communication period, and, for example, is formed using a primary battery, a secondary battery, a capacitor, or the like. In cases where the power supply device 24 is formed using a secondary battery or a capacitor, this power supply device 24 is charged by power supplied from the communication/power supply device 22.

The controller device 25 is used to control the overall RFID tag 20, and is, in this embodiment, a circuit that includes a CPU (central processing unit) 25a, a ROM (read-only memory) 25b, and a RAM 25c. Specifically, the controller device 25 performs processing of reception data received from the communication/power supply device 22, reads and writes data from and to the non-volatile memory device 23, and transmits, to the communication/power supply device 22, transmission data that is to be transmitted to the reader/writer 10.

In the present embodiment, the unique ID is burned onto the ROM 25b. In response to a predetermined request received from the reader/writer 10 through the antenna 21 and the communication/power supply device 22, the controller device 25 transmits, to the reader/writer 10, the unique ID stored in the ROM 25b. In other words, the controller device 25 cooperates with the antenna 21 and the communication/power supply device 22 to achieve the identification information response function.

Further, the controller device 25 determines, with reference to the non-volatile memory device 23, when the validity information is stored therein, that the identification information response function is valid, and, when the validity information is not stored therein, that the identification information response function is invalid.

Further, the controller device 25 has a timer function that measures an elapsed time after an invalidation command is input from the reader/writer 10, and invalidates the identification information response function when the measured elapsed time exceeds the predetermined period of time. More specifically, when the elapsed time reaches the predetermined period of time, the controller device 25 deletes the validity information stored in the non-volatile memory device 23. Here, deletion of the validity information includes changing of data to an indefinite value, and rewriting of data to be different data.

It is to be noted that, during a communication period, the controller device 25 receives power supply from the communication/power supply device 22, and, during a non-communication period, the controller device 25 receives power supply from the power supply device 24.

The database 30 is a database in which merchandise data for each item of merchandise is stored and associated with a unique ID. Here, the merchandise data includes, for example, the price, type, production history, distribution history, sales history, and the like of merchandise. The database 30 is wired or wirelessly connected to the reader/writer 10, and is capable of exchanging data with the reader/writer 10. It is to be noted that the database 30 can be omitted for cases where merchandise data is stored in the RFID tag 20. Further, the database 30 may be included in the reader/writer 10.

Figure 2:
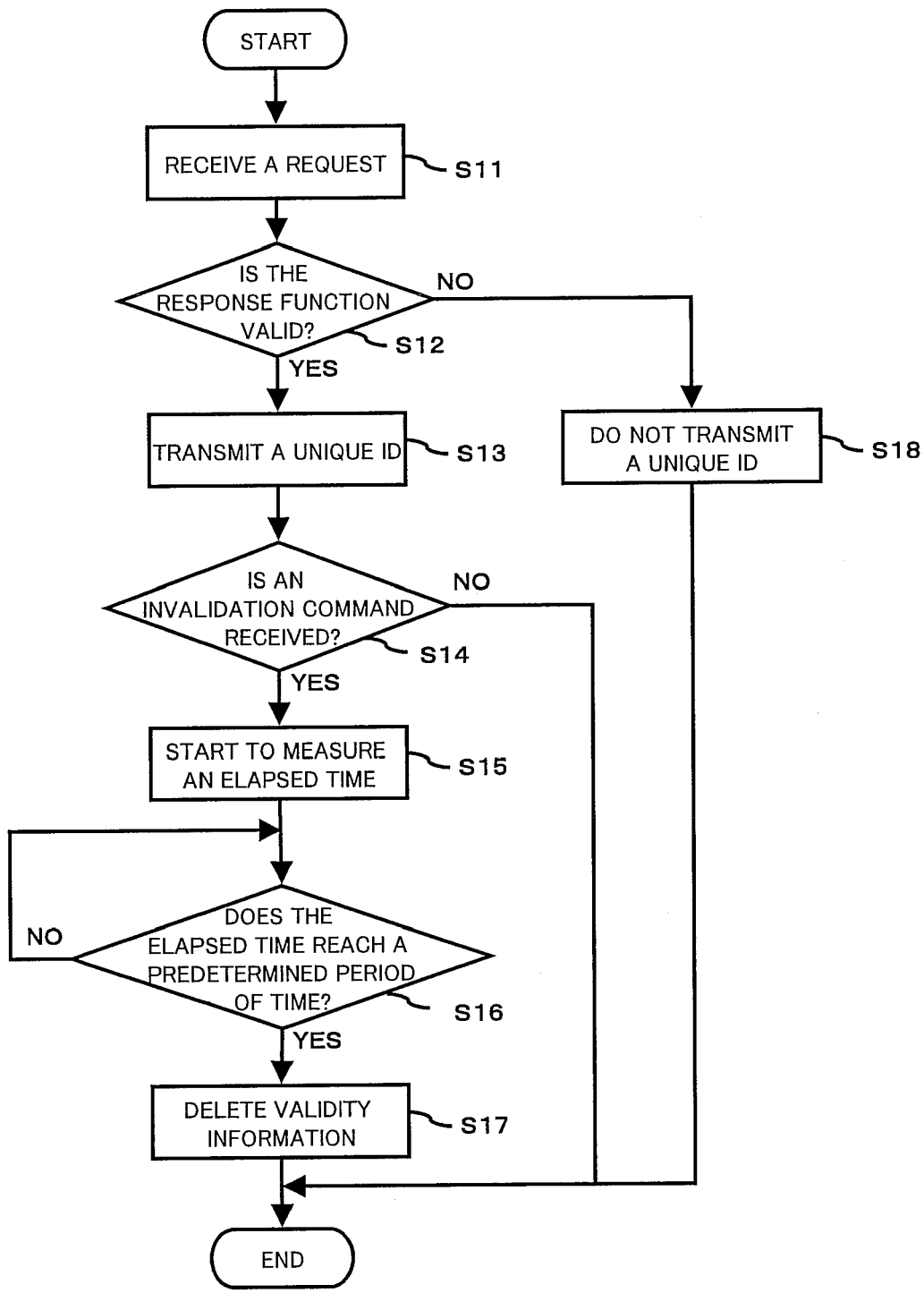
FIG. 2 is a flowchart showing operational steps performed by an RFID tag as shown in FIG. 1.

FIG. 2 is a flowchart showing operational steps performed by the RFID tag 20. Operations of the merchandise management system 1 will be described below with reference to FIG. 2, focusing on operations performed "before payment", "at the point of sale", "after payment (before invalidation)", and "after payment (after invalidation)" with respect to an item of merchandise X. It is to be noted that the validity information (for example, a bit of "1") is prewritten in the non-volatile memory device 23.

[Before Payment]

When a merchandise manager wishes to check the merchandise data of the item X in the channel of distribution or at a retail store, the merchandise manager holds a portable type reader/writer 10 over the item X, and presses a "read" button (not shown) of the reader/writer 10. In response to that, the reader/writer 10 wirelessly transmits a predetermined request requesting transmission of a unique ID.

In the RFID tag 20 attached to the item X, after the controller device 25 receives the above request (S11) through the antenna 21 and the communication/power supply device 22, the controller device 25 determines (S12) whether the identification information response function is valid or not. Specifically, when the validity information is stored in the non-volatile memory device 23, the controller device 25 determines that the function is valid, and, when the validity information is not stored in the non-volatile memory device 23, the controller device 25 determines that the function is invalid. At this time, because the non-volatile memory device 23 stores the validity information, the controller device 25 determines that the identification information response function is valid (S12: YES), and wirelessly transmits (S13) the unique ID stored in the ROM 25b through the antenna 21.

In response to the unique ID received from the RFID tag 20, the reader/writer 10 performs predetermined processing based on that unique ID. For example, the reader/writer 10 accesses the database 30 to obtain the merchandise data associated with the unique ID, and displays this merchandise data on a display (not shown) of the reader/writer 10. Thus, the merchandise manager can check the merchandise data of the item X. Alternatively, when the merchandise data is stored in the RFID tag 20, the reader/writer 10 may be configured to read the merchandise data from the RFID tag 20 after receiving the unique ID.

Next, because the reader/writer 10 does not transmit an invalidation command at this time, no invalidation command is input to the RFID tag 20 (S14: NO), and wireless communication is terminated.

[At the Point of Sale]

At a checkout counter in a retail store, when a clerk receives from a purchaser an item of merchandise X for which payment has not yet been made, the clerk places the item X in a predetermined scan area, and presses a "read" button of a fixed type reader/writer 10 that is placed at the checkout counter. In response, the reader/writer 10 wirelessly transmits a predetermined request requesting transmission of a unique ID.

In the RFID tag 20 attached to the item X, after the controller device 25 receives the above request (S11), the controller device 25 determines (S12) whether or not the identification information response function is valid. At this point, because the non-volatile memory device 23 stores the validity information, the controller device 25 determines that the identification information response function is valid (S12: YES), and wirelessly transmits the unique ID (S13) through the antenna 21.

In response to receipt of the unique ID from the RFID tag 20, the reader/writer 10 accesses the database 30 to obtain the price associated with the received unique ID, and displays this price on a display. After payment based on the displayed information is completed, the clerk presses a "payment complete" button (not shown) of the reader/writer 10, in response to which the reader/writer 10 associates a sales history including the name of the store that sold the item, the date and time of sale, and the like with the unique ID, and registers the sales history associated with the unique ID in the database 30. The reader/writer 10 also wirelessly transmits an invalidation command.

In the RFID tag 20, after the controller device 25 receives an invalidation command from the reader/writer 10 (S14: YES), the controller device 25 starts to measure an elapsed time (S15). Further, when the measured elapsed time reaches a predetermined period of time (S16: YES), the controller device 25 deletes the validity information from the non-volatile memory device 23 to invalidate the identification information response function (S17) Although the above predetermined period of time may be set as desired in consideration of a return period, in light of business practices, it is preferable that the period is set to approximately 3 to 14 days, and, in this embodiment, the period is set to 7 days.

[After Payment (Before Invalidation)]

When the purchaser wishes to return the item X and brings it to the retail store within 7 days after the item X is sold (within the return period), a clerk places the item X in a predetermined scan area, and presses the "read" button of the reader/writer 10 placed at a checkout counter. In response to that, the reader/writer 10 wirelessly transmits a predetermined request requesting transmission of a unique ID.

In the RFID tag 20 attached to the item X, after the controller device 25 receives the above request (S11), the controller device 25 determines (S12) whether or not the identification information response function is valid. At this point, because the non-volatile memory device 23 stores the validity information, the controller device 25 determines that the identification information response function is valid (S12: YES), and wirelessly transmits the unique ID (S13) through the antenna 21.

In response to the unique ID received from the RFID tag 20, the reader/writer 10 accesses the database 30 to obtain the sales history associated with the unique ID, and displays this sales history on the display of the reader/writer 10. Thus, it is possible for the clerk to check the store that sold the item and the date and time of sale, and it is therefore easy to deal with the returned item. Further, it is possible to appropriately respond to return requests, and it is possible to suitably respond to customers.

Subsequently, because the reader/writer 10 does not transmit an invalidation command at this time, no invalidation command is input to the RFID tag 20 (S14: NO), and wireless communication is terminated.

[After Payment (After Invalidation)]

Next, a case where a third party tries to read the unique ID from the RFID tag 20 of the item X using a reader/writer after 7 days have elapsed after the item X is sold (outside the return period) will be described. In this case, the reader/writer 15, wirelessly transmits a predetermined request requesting transmission of a unique ID.

In the RFID tag 20 attached to the item X, after the controller device 25 receives the above request (S11), the controller device 25 determines (S12) whether or not the identification information response function is valid. At this point, because the function has been invalidated and the non-volatile memory device 23 does not store the validity information, the controller device 25 determines that the identification information response function is invalid (S12: NO), and does not wirelessly transmit the unique ID (S18). For example, the controller device 25 may be configured to provide no response to the above request. Alternatively, the controller device 25 may be configured to transmit error notification information or other information other than the unique ID. As a result, the third party cannot read the unique ID from the RFID tag 20, and leakage of information is prevented.

The above-described embodiment provides the following effects:

(1) Because the identification information response function becomes invalid after an invalidation instruction is input from outside to the RFID tag followed by a lapse of predetermined period of time, it is possible to read the tag identification information within the predetermined period of time, whereas it is impossible to read the tag identification information outside the predetermined period of time. Therefore, it is possible to facilitate dealing with returned merchandise while reducing the risk of leakage of information.

(2) Because time elapsed after an invalidation instruction is input is measured, and the identification information response function is invalidated when the measured elapsed time exceeds a predetermined period of time, it is possible to invalidate the identification information response function accurately at a desired point in time.

SECOND EMBODIMENT

Figure 3:
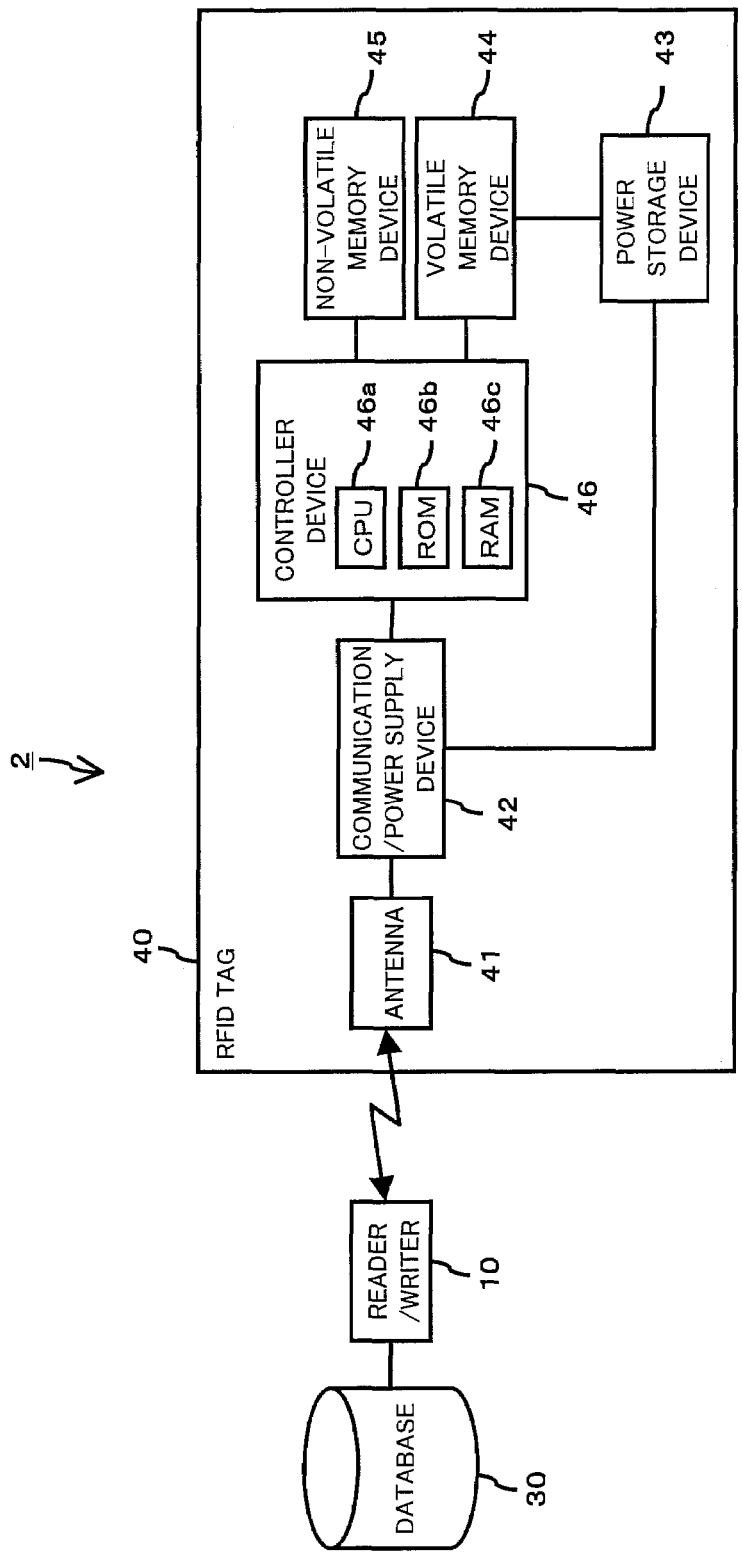
FIG. 3 is a block diagram showing a structure of a merchandise management system according to a second embodiment of the present invention.

FIG. 3 is a block diagram showing a structure of a merchandise management system 2 according to a second embodiment of the present invention. This merchandise management system 2 has many features in common with the above-described merchandise management system 1, but uses an RFID tag having a different structure. Specifically, an RFID tag 40 of the present embodiment includes a power storage device 43 that stores power, and, after an invalidation instruction is input, the identification information response function becomes invalid when the voltage of the power storage device 43 decreases to be lower than a predetermined voltage. In the description of the merchandise management system 2 which follows, identical reference numerals are used to denote components identical to those of the above-described merchandise management system 1, and explanations thereof are omitted here.

As shown in FIG. 3, the RFID tag 40 includes an antenna 41, a communication/power supply device 42, a power storage device 43, a volatile memory device 44, a non-volatile memory device 45, and a controller device 46. Among these, the antenna 41 and the communication/power supply device 42 are similar to those of the above-described merchandise management system 1.

The power storage device 43 stores power. This power storage device 43 is preferably a chargeable device, such as a capacitor, a secondary battery, or the like, and, in this embodiment, is an electric double layer capacitor. The power storage device 43 is charged by power supplied from the communication/power supply device 42.

The volatile memory device 44 receives power supply from the power storage device 43, and stores validity information indicating that the identification information response function is valid, and, in this embodiment, is a RAM. Information stored in this volatile memory device 44 volatilizes when the output voltage of the power storage device 43 decreases to be lower than a predetermined voltage, or, in other words, when the power supply from the power storage device 43 ceases.

The non-volatile memory device 45 is a non-volatile storage medium that stores invalidity information indicating that the identification information response function is invalid except in cases where the validity information is stored in the volatile memory device 44, and, in this embodiment, is an EEPROM. Other data other than the invalidity information such as merchandise data or the like may also be written to this non-volatile memory device 45.

The controller device 46 is used to control the overall RFID tag 40, and is, in this embodiment, a circuit that includes a CPU 46a, a ROM 46b, and a RAM 46c. In the present embodiment, when an invalidation instruction is input from the outside, the controller device 46 sets the validity information in the volatile memory device 44, and sets the invalidity information in the non-volatile memory device 45. In this embodiment, the invalidation instruction input from the outside is an invalidation command transmitted from the reader/writer 10. Further, when the invalidity information is not stored in the non-volatile memory device 45, or when the validity information is stored in the volatile memory device 44, the controller device 46 determines that the identification information response function is valid, and, when the invalidity information is stored in the non-volatile memory device 45, and the validity information is not stored in the volatile memory device 44, the controller device 46 determines that the identification information response function is invalid.

Figure 4:
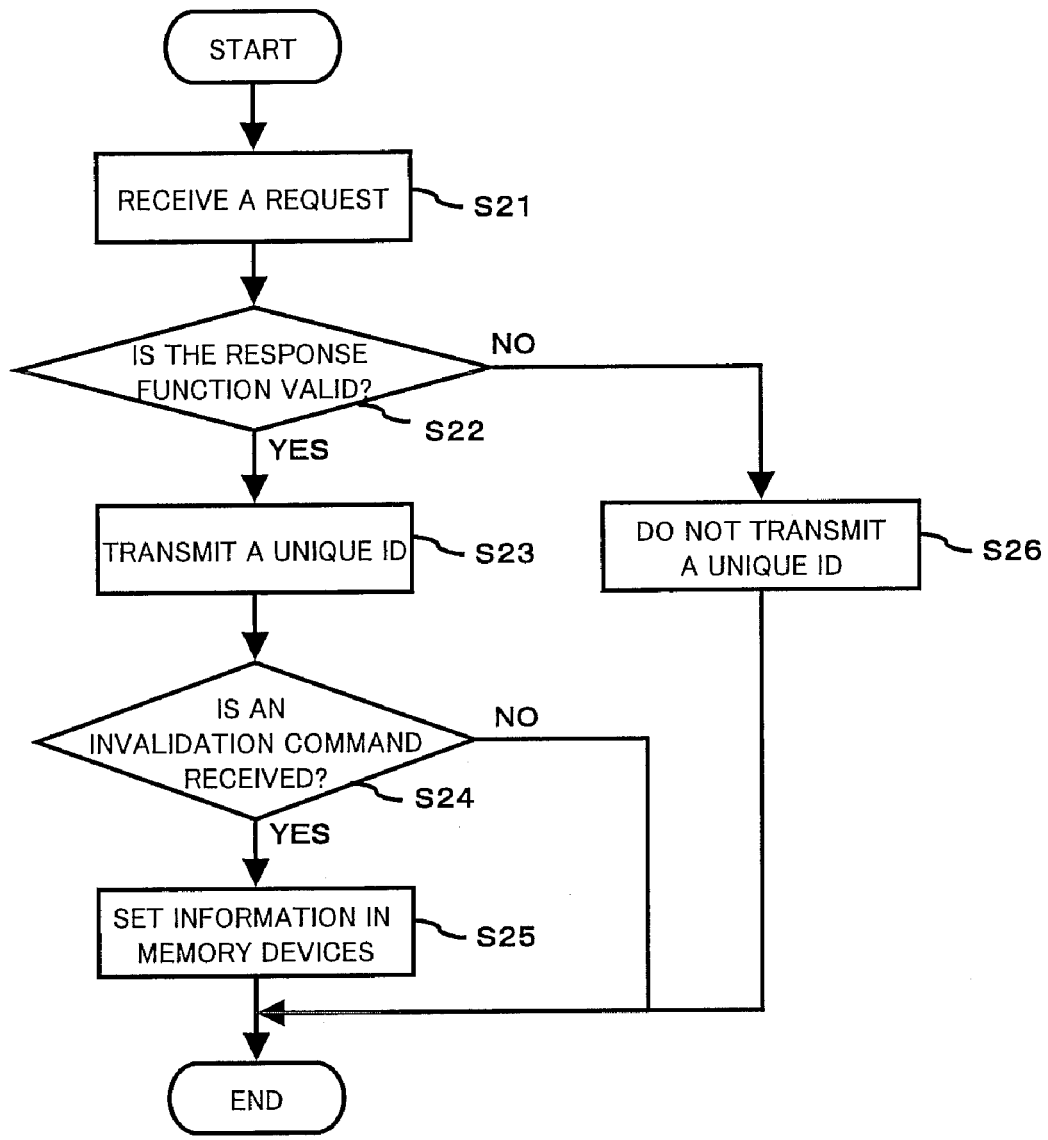
FIG. 4 is a flowchart showing operational steps performed by an RFID tag as shown in FIG. 3.

FIG. 4 is a flowchart showing operational steps performed by the RFID tag 40. Operations of the merchandise management system 2 will be described below with reference to FIG. 4, focusing on operations performed "before payment", "at the point of sale", "after payment (before invalidation)", and "after payment (after invalidation)" with respect to an item of merchandise X. In this embodiment, in an initial state, the volatile memory device 44 does not store the validity information, and the non-volatile memory device 45 does not store the invalidity information. In the following description, explanations corresponding to those of the above-described merchandise management system 1 are simplified where appropriate.

[Before Payment]

Along a channel of distribution or at a retail store, when a merchandise manager holds a portable type reader/writer 10 over the item X, and presses a "read" button of the reader/writer 10, the reader/writer 10 wirelessly transmits a predetermined request.

In the RFID tag 40 attached to the item X, after the controller device 46 receives the above request (S21), the controller device 46 determines (S22) whether the identification information response function is valid or not. Specifically, when the invalidity information is not stored in the non-volatile memory device 45, or when the validity information is stored in the volatile memory device 44, the controller device 46 determines that the function is valid, and, otherwise, the controller device 46 determines that the function is invalid. At this point, because the non-volatile memory device 45 does not store the invalidity information, the controller device 46 determines that the identification information response function is valid (S22: YES), and wirelessly transmits the unique ID (S23) through the antenna 41.

In response to the unique ID received from the RFID tag 40, the reader/writer 10 obtains and displays the merchandise data associated with this unique ID.

Subsequently, because the reader/writer 10 does not transmit an invalidation command at this time, no invalidation command is input to the RFID tag 40 (S24: NO), and wireless communication is terminated.

[At the Point of Sale]

At a checkout counter, when an item of merchandise X which has not yet been purchased is placed in a scan area and a "read" button of a fixed type reader/writer 10 is pressed, the reader/writer 10 wirelessly transmits a predetermined request.

In the RFID tag 40 attached to the item X, after the controller device 46 receives the above request (S21), the controller device 46 determines (S22) whether or not the identification information response function is valid. At this point, because the non-volatile memory device 45 does not store the invalidity information, the controller device 46 determines that the identification information response function is valid (S22: YES), and wirelessly transmits the unique ID (S23) through the antenna 41.

In response to the unique ID received from the RFID tag 40, the reader/writer 10 displays the price associated with this unique ID. After payment based on the displayed information is completed, the clerk presses a "payment complete" button (not shown) of the reader/writer 10. In response to that, the reader/writer 10 associates a sales history with the unique ID, and registers the sales history associated with the unique ID in the database 30. Further, the reader/writer 10 wirelessly transmits an invalidation command.

In the RFID tag 40, after the controller device 46 receives an invalidation command from the reader/writer 10 (S24: YES), the controller device 46 sets the validity information (in this embodiment, a bit string of "101010") in the volatile memory device 44, and sets the invalidity information (in this embodiment, a bit of "1") in the non-volatile memory device 45 (S25). In this regard, the reason that the validity information is set to contain multiple bits is because data stored in a RAM becomes an indefinite value when the data volatilizes.

In the above-described wireless communication, it is preferable that the power storage device 43 of the RFID tag 40 is charged to an extent such that the amount of power stored therein is approximately equal to the capacity thereof, that is, to a fully charged condition. In this embodiment, the reader/writer 10 emits electromagnetic waves for a predetermined period of time required for full charge to charge the power storage device 43. In this regard, although the capacity of the power storage device 43 may be selected as desired in consideration of a return period, in light of business practices, it is preferable that the capacity is equal to an amount necessary to maintain the validity information for 3 to 14 days, and, in this embodiment, the capacity is set to an amount necessary to maintain the validity information for approximately 7 days. It is to be noted that, although the power storage device 43 is fully charged in this embodiment, it is also preferable that the power storage device 43 is charged to a predetermined amount of power storage smaller than the capacity of the power storage device. Further, although the power storage device 43 is charged at the time of payment in this embodiment, charging may be performed at a different point in time. Further, although electromagnetic waves are emitted for a predetermined period of time in this embodiment, electromagnetic waves may be emitted until a charge completion notification is received from the RFID tag 40.

Further, in order to reliably avoid a situation in which additional power supply delays the time of volatilization, it is preferable that charging of the power storage device 43 is prohibited after an invalidation command is input. In this embodiment, the communication/power supply device 42 is configured such that, when the invalidity information is stored in the non-volatile memory device 45, the function of charging the power storage device 43 becomes invalid.

After the above-described wireless communication is completed, the amount of power storage of the power storage device 43 is reduced by discharge, and the voltage of the power storage device 43 decreases. When the voltage of the power storage device 43 decreases to be lower than a voltage necessary to maintain data stored in the volatile memory device 44, the validity information written at the step S25 volatilizes, and the identification information response function becomes invalid. In this embodiment, additional charging is prohibited after input of an invalidation command, and the validity information volatilizes after approximately 7 days have elapsed.

[After Payment (Before Invalidation)]

When the purchaser wishes to return the item X and brings it to the retail store within 7 days after the item X is sold, a clerk places the item X in a predetermined scan area, and presses the "read" button of the reader/writer 10. In response to that, the reader/writer 10 wirelessly transmits a predetermined request.

In the RFID tag 40 attached to the item X, after the controller device 46 receives the above request (S21), the controller device 46 determines (S22) whether the identification information response function is valid or not. At this time, because the volatile memory device 44 stores the validity information, the controller device 46 determines that the identification information response function is valid (S22: YES), and wirelessly transmits the unique ID (S23) through the antenna 41.

In response to the unique ID received from the RFID tag 40, the reader/writer 10 obtains and displays the sales history associated with this unique ID. Thus, it is possible for the clerk to check the store that sold the item and the date and time of sale, and it is therefore easy to deal with the returned item.

After that, because the reader/writer 10 does not transmit an invalidation command at this time, no invalidation command is input to the RFID tag 40 (S24: NO), and wireless communication is terminated.

[After Payment (After Invalidation)]

Next, a case where a third party tries to read the unique ID from the RFID tag 40 of the item X using a reader/writer after 7 days have elapsed after the item X is sold will be described. In this case, the reader/writer wirelessly transmits a predetermined request.

In the RFID tag 40 attached to the item X, after the controller device 46 receives the above request (S21), the controller device 46 determines (S22) whether the identification information response function is valid or not. At this time, because the non-volatile memory device 45 stores the invalidity information, and the volatile memory device 44 does not store the validity information, the controller device 46 determines that the identification information response function is invalid (S22: NO), and does not wirelessly transmit the unique ID (S26). As a result, the third party cannot read the unique ID from the RFID tag 40, and leakage of information is prevented.

The above-described embodiment provides the following effects in addition to an effect similar to the above-described effect (1).

(3) In the RFID tag according to the present embodiment, when the voltage of the power storage device decreases to be lower than a predetermined voltage after an invalidation instruction is input, the identification information response function becomes invalid. Therefore, when compared with a structure wherein an elapsed time is measured after an invalidation instruction is input, it is possible to reduce power consumption, and it is possible to decrease the capacity of the power storage device. As a result, it is possible to reduce the size and cost of the RFID tag.

(4) The power storage device is configured to be chargeable, and the RFID tag converts energy supplied from the outside to produce power, and charges the power storage device using the produced power. Therefore, it is possible to charge the power storage device to a desired amount of power storage at desired time, and, when compared with cases where the power storage device is formed using a primary battery in which the amount of power storage is gradually decreased by spontaneous discharge, it is possible to reduce variations in period of time from input of an invalidation instruction until the validity information volatilizes.

(5) The RFID tag is a passive type tag including a communication/power supply device that converts electromagnetic wave energy supplied from the outside to produce power, and which uses the power produced by this communication/power supply device as operating power, and the power storage device is charged by the power produced by the communication/power supply device. Therefore, when a passive type RFID tag is employed, it is unnecessary to add an additional circuit for power conversion, and it is possible to achieve simplification of the structure and cost reduction.

(6) Because the power storage device is charged to a predetermined amount of power storage at the time of payment, it is possible to maintain the period of time from completion of payment until the validity information volatilizes to be approximately constant.

(7) Because charging of the power storage device is prohibited after an invalidation instruction is input, it is possible to prevent a situation in which additional charging delays the time of volatilization of the validity information.

THIRD EMBODIMENT

Figure 5:
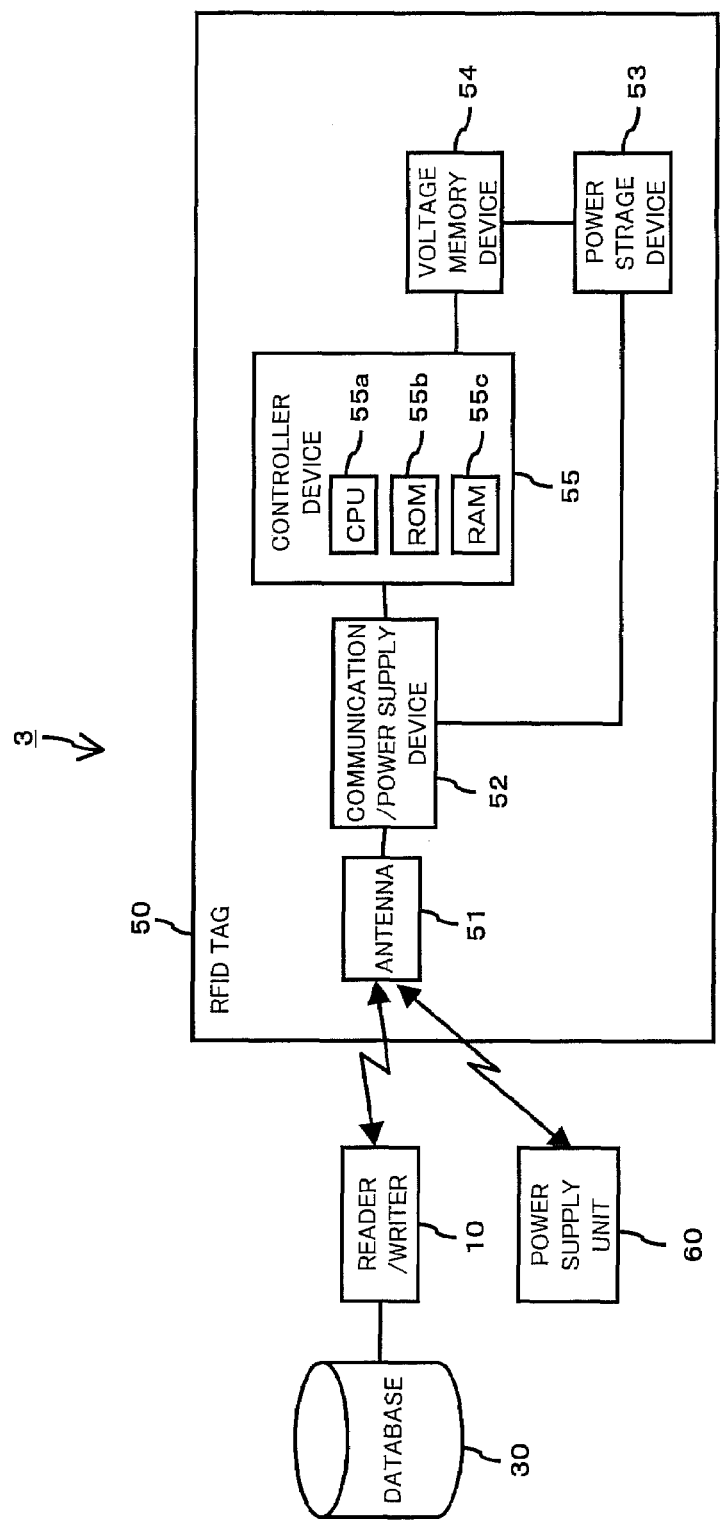
FIG. 5 is a block diagram showing a structure of a merchandise management system according to a third embodiment of the present invention.

FIG. 5 is a block diagram showing a structure of a merchandise management system 3 according to the third embodiment. This merchandise management system 3 has many features in common with the above-described merchandise management system 2, but uses an RFID tag having a different structure. Specifically, an RFID tag 50 of the present embodiment includes a volatile memory device 54 that prestores the validity information, and, when the voltage of a power storage device 53 decreases and the validity information volatilizes, the identification information response function becomes invalid. In addition to the reader/writer 10, the RFID tag 50, and the database 30, the merchandise management system 3 of the present embodiment further includes a power supply unit 60. Although the merchandise management system 3 will be described below, identical reference numerals are used to denote components identical to those of the above-described merchandise management system 1 or 2, and explanations thereof are omitted here.

As shown in FIG. 5, the RFID tag 50 includes an antenna 51, a communication/power supply device 52, a power storage device 53, a volatile memory device 54, and a controller device 55. Among these, the antenna 51, the communication/power supply device 52, the power storage device 53, and the volatile memory device 54 are similar to those of the above-described merchandise management system 2.

The controller device 55 is used to control the overall RFID tag 50, and is, in this embodiment, a circuit that includes a CPU 55a, a ROM 55b, and a RAM 55c. In the present embodiment, when the validity information is stored in the volatile memory device 54, the controller device 55 determines that the identification information response function is valid, and, when the validity information is not stored in the volatile memory device 54, the controller device 55 determines that the identification information response function is invalid.

The power supply unit 60 is a unit that emits electromagnetic waves to supply power to the RFID tag 50. This power supply unit 60 is used to charge the power storage device 53 of the RFID tag 50, and is provided at places in the channel of distribution of merchandise, such as warehouses, cargo ships, delivery trucks, and retail stores, in order to maintain storage of the validity information in the volatile memory device 54. It is to be noted that the power supply unit 60 may be of a fixed type that is to be placed in a warehouse, a transport container, a display cabinet, or the like, or may be of a portable type that is to be carried by a merchandise manager.

Figure 6:
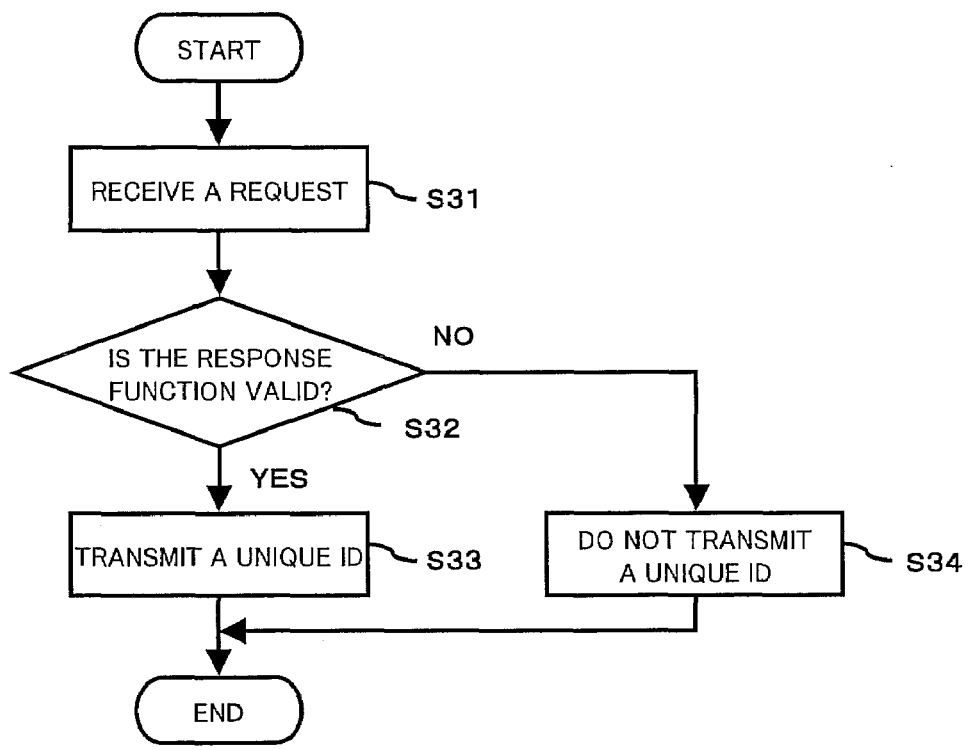
FIG. 6 is a flowchart showing operational steps performed by an RFID tag as shown in FIG. 5.

FIG. 6 is a flowchart showing operational steps performed by the RFID tag 50. Operations of the merchandise management system 3 will be described below with reference to FIG. 6, focusing on operations performed "before payment", "at the point of sale", "after payment (before invalidation)", and "after payment (after invalidation)" with respect to an item of merchandise X. In the following description, the volatile memory device 54 prestores the validity information (in this embodiment, a bit string of "101010"). In this regard, the reason that the validity information is set to contain multiple bits is because data stored in a RAM becomes an indefinite value when the data volatilizes. Further, the validity information may be written to the volatile memory device 54 based on a special communication protocol using a special reader/writer at, for example, production facilities of the RFID tag 50 or merchandise. Alternatively, the validity information may be written using a special tool wired to the volatile memory device 54. In the following description, explanations corresponding to those of the above-described merchandise management system 1 or 2 are simplified where appropriate.

[Before Payment]

The RFID tag 50 attached to the item X receives power supply from the power supply unit 60 provided at places in the channel of distribution or within a store. Thus, the power storage device 53 of the RFID tag 50 is charged, and storage of the validity information is maintained. It is to be noted that the specific method of power supply is not limited to a particular method, but, for example, power may be supplied by electromagnetic waves continuously or intermittently emitted from the fixed type power supply unit 60, or a merchandise manager may carry the portable type power supply unit 60 and make rounds to supply power.

In a distribution warehouse or a retail store, when a merchandise manager holds the portable type reader/writer 10 over the item X, and presses the "read" button of the reader/writer 10, the reader/writer 10 wirelessly transmits a predetermined request.

In the RFID tag 50 attached to the item X, after the controller device 55 receives the above request (S31) from the reader/writer 10, the controller device 55 determines (S32) whether the identification information response function is valid or not. Specifically, when the validity information is stored in the volatile memory device 54, the controller device 55 determines that the function is valid, and, when the validity information is not stored in the volatile memory device 54, the controller device 55 determines that the function is invalid. At this time, because the volatile memory device 54 stores the validity information, the controller device 55 determines that the identification information response function is valid (S32: YES), and wirelessly transmits the unique ID (S33) through the antenna 51.

In response to the unique ID received from the RFID tag 50, the reader/writer 10 obtains and displays the merchandise data associated with this unique ID.

[At the Point of Sale]

At a checkout counter, when an item of merchandise X for which payment has not yet been made is placed in a scan area, and the "read" button of the fixed type reader/writer 10 is pressed, the reader/writer 10 wirelessly transmits a predetermined request.

In the RFID tag 50 attached to the item X, after the controller device 55 receives the above request (S31), the controller device 55 determines (S32) whether the identification information response function is valid or not. At this time, because the volatile memory device 54 stores the validity information, the controller device 55 determines that the identification information response function is valid (S32: YES), and wirelessly transmits the unique ID (S33) through the antenna 51.

In response to the unique ID received from the RFID tag 50, the reader/writer 10 obtains and displays the price associated with this unique ID. After payment based on the displayed information is completed, the clerk presses the "payment complete" button of the reader/writer 10, in response to which the reader/writer 10 associates a sales history with the unique ID, and registers the sales history associated with the unique ID in the database 30.

In the above-described wireless communication, it is preferable that the power storage device 53 of the RFID tag 50 is charged to an extent such that the amount of power stored therein is approximately equal to the capacity thereof, that is, to a fully charged condition. In this embodiment, the reader/writer 10 emits electromagnetic waves for a predetermined period of time required for full charge to charge the power storage device 53. In this regard, although the capacity of the power storage device 53 may be selected as desired in consideration of a return period, in light of business practices, it is preferable that the capacity is equal to an amount necessary to maintain the validity information for 3 to 14 days, and, in this embodiment, the capacity is set to an amount necessary to maintain the validity information for approximately 7 days. It is to be noted that, although the power storage device 53 is fully charged in this embodiment, it is also preferable that the power storage device 53 is charged to a predetermined amount of power storage smaller than the capacity of the power storage device. Further, although electromagnetic waves are emitted for a predetermined period of time in this embodiment, electromagnetic waves may be emitted until a charge completion notification is received from the RFID tag 50.

After payment is completed, the purchaser removes the item X from the store. In other words, after the above-described wireless communication is completed, the RFID tag 50 is removed from an area in which power can be supplied from the power supply unit 60 or the reader/writer 10. Therefore, the power storage device 53 does not receive additional power supply, the amount of power storage of the power storage device 53 is reduced by discharge, and the voltage of the power storage device 53 decreases. When the voltage of the power storage device 53 decreases to less than a voltage necessary to maintain data stored in the volatile memory device 54, the validity information stored in the volatile memory device 54 volatilizes, and the identification information response function becomes invalid. In this embodiment, the validity information volatilizes after approximately 7 days have elapsed after completion of payment.

[After Payment (Before Invalidation)]

When the purchaser wishes to return the item X and brings it to the retail store within 7 days after the item X is sold, a clerk places the item X in a predetermined scan area, and presses the "read" button of the reader/writer 10. In response to that, the reader/writer 10 wirelessly transmits a predetermined request.

In the RFID tag 50 attached to the item X, after the controller device 55 receives the above request (S31), the controller device 55 determines (S32) whether or not the identification information response function is valid. At this point, because the volatile memory device 54 stores the validity information, the controller device 55 determines that the identification information response function is valid (S32: YES), and wirelessly transmits the unique ID (S33) through the antenna 51.

In response to the unique ID received from the RFID tag 50, the reader/writer 10 obtains and displays the sales history associated with this unique ID. Thus, it is possible for the clerk to verify the store that sold the item and the date and time of sale, and it is therefore easy to deal with the returned item.

[After Payment (After Invalidation)]

Next, a case where a third party tries to read the unique ID from the RFID tag 50 of the item X using a reader/writer after 7 days have elapsed after the item X is sold will be described. In this case, the reader/writer wirelessly transmits a predetermined request.

In the RFID tag 50 attached to the item X, after the controller device 55 receives the above request (S31), the controller device 55 determines (S32) whether or not identification information response function is valid. At this point, because the volatile memory device 54 does not store the validity information, the controller device 55 determines that the identification information response function is invalid (S32: NO), and does not wirelessly transmit the unique ID (S34). As a result, the third party cannot read the unique ID from the RFID tag 50, and leakage of information is prevented.

The above-described embodiment provides the following effects in addition to effects similar to the above-described effects (1), and (4) to (6).

(8) In the RFID tag according to the present embodiment, when the voltage of the power storage device decreases to be lower than a predetermined voltage after the charging of the power storage device ceases, the identification information response function becomes invalid. Therefore, when compared with a structure wherein an elapsed time is measured, it is possible to reduce power consumption, and it is possible to decrease the capacity of the power storage device. As a result, it is possible to reduce the size and cost of the RFID tag. Further, because input of an invalidation instruction from the outside is unnecessary, the communication procedures can be simplified, and operational burdens for clerks are reduced. Further, because the non-volatile memory device is unnecessary, the present embodiment is advantageous in reducing the size and cost of the RFID tag.

(9) When a structure in which input of an invalidation instruction is received from the outside, and the charging of the power storage device is prohibited after the invalidation instruction is input is employed, it is possible to prevent a situation in which additional charging delays the time of volatilization of the validity information. For example, such a structure is achieved as will be described below. That is, when the "payment complete" button is pressed, the reader/writer 10 wirelessly transmits an invalidation command. Then, in response to receipt of the invalidation command, the controller device 55 of the RFID tag 50 invalidates the charging function for charging the power storage device 53 in an appropriate method.

It is to be understood that the present invention is not limited to the above-described embodiments, but may be modified in various manners without departing from the essence of the present invention.

For example, although the power storage device is charged by converting electromagnetic wave energy into power in the above-described second and third embodiments, the present invention is not limited to such embodiments, but, instead of electromagnetic wave energy, other types of energy such as optical energy, thermal energy, and vibrational energy may be used. However, in such cases, it is necessary to additionally provide a power conversion device that converts energy supplied from the outside to produce power, and charges the power storage device using the produced power.

Further, the RFID tag used as a merchandise management tag may also be used as an anti-shoplifting tag. For example, information indicating whether payment is completed or not is stored in the non-volatile memory device of the RFID tag, and the information is rewritten at the time of completion of payment from "payment pending" to "payment completed". Thus, if there is a structure in which the information is read at an entrance of a store or the like, it is possible to use the RFID tag as an anti-shoplifting tag.

The disclosure of Japanese Patent Application No. 2004-371839 filed on Dec. 22, 2004, including the specification, claims, drawings, and abstract, is incorporated herein by reference in its entirety.

What is claimed is:

1. An RFID tag comprising:
an identification information response function that wirelessly transmits tag identification information stored in the RFID tag in response to a predetermined wireless request, wherein the identification information response function becomes invalid after an invalidation instruction is input from outside followed by a lapse of predetermined period of time; and
a power storage device that stores power, wherein when a voltage of the power storage device decreases to be lower than a predetermined voltage after the invalidation instruction is input, the identification information response function becomes invalid.

2. An RFID tag comprising:
an identification information response function that wirelessly transmits tag identification information stored in the RFID tag in response to a predetermined wireless request;
a power storage device that stores power; a volatile memory device that receives the power supply from the power storage device, and stores validity information indicating that the identification information response function is valid;
a non-volatile memory device that stores invalidity information indicating that the identification information response function is invalid except in cases where the validity information is stored in the volatile memory device;
an information setting device that sets the validity information in the volatile memory device, and sets the invalidity information in the non-volatile memory device when an invalidation instruction is input from outside; and
a controller device that determines the identification information response function is valid when the invalidity information is not stored in the non-volatile memory device or when the validity information is stored in the volatile memory device, and, in other cases, determines that the identification information response function is invalid, wherein the identification information response function becomes invalid when a voltage of the power storage device decreases and the validity information volatilizes after the invalidation instruction is input.

3. An RFID tag according to claim 1, further comprising:
a power conversion device that converts energy supplied from outside to e power, and charges up the power storage device with the power produced by the power conversion device.

4. An RFID tag according to claim 3, wherein the energy supplied from the outside is electromagnetic wave energy, and the RFID tag is a passive type tag that uses the power produced by the power conversion device as operating power.

5. An RFID tag according to claim 3, wherein charging of the power storage device is prohibited after the invalidation instruction is input.

6. An RFID tag according to claim 4, wherein charging of the power storage device is prohibited after the invalidation instruction is input.

7. An RFID tag, comprising:
an identification information response function that wirelessly transmits tag identification information stored in the RFID tag in response to a predetermined wireless request, a power storage device that stores power;
a volatile memory device that receives the power supply from the power storage device, and prestores validity information indicating that the identification information response function is valid; and a controller device that determines the identification information response function is valid when the validity information is stored in the volatile memory device, and determines the identification information response function is invalid when the validity information is not stored in the volatile memory device, wherein the identification information response function becomes invalid when a voltage of the power storage device decreases and the validity information volatilizes.

8. An RFID tag according to claim 7, further comprising:
a power conversion device that converts energy supplied from outside to power, and charges up the power storage device with the power produced by the power conversion device.

9. An RFID tag according to claim 8, wherein the energy supplied from the outside is electromagnetic wave energy, and the RFID tag is a passive type tag that uses the power produced by the power conversion device as operating power.

10. An RFID tag according to claim 8, wherein charging of the power storage device is prohibited after an invalidation instruction is input from outside.

11. An RFID tag according to claim 9, wherein charging of the power storage device is prohibited after an invalidation instruction is input from outside.

12. A merchandise management system, comprising:
an RFID tag that is attached to each item of merchandise and has an identification information response function that wirelessly transmits tag identification information stored in the RFID tag in response to a predetermined wireless request, wherein the identification information response function becomes invalid after an invalidation instruction is input from outside followed by a lapse of predetermined period of time;

a power storage device that stores power is further comprised, and, when a voltage of the power storage device decreases to be lower than a predetermined voltage after the invalidation instruction is input, the identification information response function becomes invalid; and a reader unit that wirelessly transmits the predetermined request and reads the tag identification information from the RFID tag.

13. A merchandise management system, comprising:
an RFID tag that is attached to each item of merchandise and has an identification information response function that wirelessly transmits tag identification information stored in the RFID tag in response to a predetermined wireless request;

a power storage device that stores power;

a volatile memory device that receives the power supply from the power storage device, and prestores validity information indicating that the identification information response function is valid;

a controller device that determines the identification information response function is valid when the validity information is stored in the volatile memory device, and determines the identification information response function is invalid when the validity information is not stored in the volatile memory device; and a reader unit that wirelessly transmits the predetermined request and reads the tag identification information from the RFID tag, wherein the identification information response function becomes invalid when a voltage of the power storage device decreases and the validity information volatilizes.

14. A merchandise management system according to claim 12, further comprising a communication unit that, when payment of an item of merchandise is completed, transmits the invalidation instruction to the RFID tag attached to the item of merchandise.

* * * * *